United States Patent [19]

Takahashi

[11] Patent Number: 4,810,035
[45] Date of Patent: Mar. 7, 1989

[54] DRIVER HOLDER SEAT
[75] Inventor: Fujio Takahashi, Ayase, Japan
[73] Assignee: Ikeda Bussan Co., Ltd., Ayase, Japan
[21] Appl. No.: 90,602
[22] Filed: Aug. 28, 1987
[30] Foreign Application Priority Data Aug. 29, 1986 [JP] Japan .................................. 61-201841

[51] Int. Cl.⁴ ........................ A47C 31/00; B60R 21/00
[52] U.S. Cl. ..................................... 297/464; 297/417
[58] Field of Search ......................... 297/464, 486, 417

[56] References Cited

U.S. PATENT DOCUMENTS

| | | | |
|---|---|---|---|
| 325,149 | 8/1885 | Bacon | 297/417 |
| 1,399,744 | 12/1921 | Brophy | 297/417 |
| 2,182,915 | 12/1939 | Connolly | 297/417 X |
| 2,859,803 | 11/1958 | McCallister | 297/486 |
| 2,997,341 | 8/1961 | Borgia | 297/369 |
| 3,883,175 | 5/1975 | Rodaway | 297/417 X |
| 4,097,088 | 6/1978 | Meiller | 297/417 |
| 4,225,183 | 9/1980 | Hanagan et al. | 297/417 |
| 4,522,445 | 6/1985 | Goldner et al. | 297/464 |

FOREIGN PATENT DOCUMENTS 485217 10/1929 Fed. Rep. of Germany ...... 297/417

Primary Examiner—Francis K. Zugel
Attorney, Agent, or Firm—Foley & Lardner, Schwartz, Jeffery, Schwaab, Mack, Blumenthal & Evans

[57] ABSTRACT

A driver holder seat comprising a seat cushion, a seat back and side support members each pivoted on one side of that portion of the seat where the seat cushion and back are crossed each other, and provided with protection portions swelled from the sides of the seat cushion and back to hold the driver's upper and lower halves.

6 Claims, 2 Drawing Sheets

DRIVER HOLDER SEAT

BACKGROUND OF THE INVENTION

1. Field of the Invention

The present invention relates to a driver holder seat most suitable for use with industrial vehicles such as those which are used in farms and construction sites and as forklift trucks.

2. Description of the Prior Art

The industrial vehicle such as the forklift truck 1 shown in FIG. 1, for example, comprises forks 2 arranged at its front, a support frame 4 erected on a floor 5 above the engine room to serve as the sunshade or the like, and a driver holder seat 3 arranged inside the support frame 4, wherein the driver (A) can sit on the seat 3 to drive the forklift truck 1 and operate the forks 2.

The forklift truck 1 usually has a floor higher on the ground, and often runs on weak grounds and lifts heavy materials. Its body is therefore heavily pitched and rolled in these cases and there is the possibility of its driver's being thrown from the seat 3 against the support frame 4, for example. In order to avoid this, the driver holder seat for use with the industrial vehicles of this kind is designed to hold the driver by means of a seat belt. It is also arranged to have support arms on both sides of the seat so as to prevent the driver from being thrown from the seat and swung left and right with the belt fastened around him. Safety is thus enhanced.

In order to make the driver's safety more reliable, however, it is preferable to provide the seat cushion and back with members such as the support arms so as to hold his upper and lower halves. When the seat cushion and back are thus provided with the support arms, however, the seat becomes more complicated in construction. In addition, the support arms arranged on both sides of the seat hinder him from releasing the seat to get off the truck. Therefore, the support arms must be made swingable, for example, not to hinder him when he gets off the seat. When the easiness of his getting on and off the seat as well as his safety must be considered, therefore, the cost of the seat becomes higher.

SUMMARY OF THE INVENTION

The present invention is intended to eliminate the above-mentioned drawbacks.

An object of the present invention is therefore to provide a driver holder seat excellent on safety and capable of reliably protecting the driver.

Another object of the present invention is to provide a driver holder seat enabling the driver to get on and off the vehicle without being hindered by those members which serve to support his sides.

A further object of the present invention is to provide a driver holder seat simple in construction.

A driver holder seat according to the present invention includes members each pivoted swingable backward on a side of that portion where the seat cushion is crossed with the seat back, and provided with protection portions erected from both sides of the seat cushion and back to hold the driver's upper and lower halves.

When the driver is seated, his upper and lower halves can be held by the protection portions. When the support members are swung backward, he can smoothly sit on and get off the seat without being hindered by the protection portions and the like.

According to a driver holder seat of the present invention, the driver's upper and lower halves can be held by the protection portions of the support members to prevent him from being swung left and right, thereby enabling his protection to be made more reliable and his safety to be enhanced. Further, he can sit on and get off the seat without being hindered by the support members when the support members are swung backward. Furthermore, each of the support members is made independently and pivoted swingable backward on a side of the seat, thereby making it possible to easily apply them to any of the conventional seats. In addition, the seat can be made simple in construction.

BRIEF DESCRIPTION OF THE DRAWING

FIG. 4 shows the support member normally used.

DETAILED DESCRIPTION OF THE PREFERRED EMBODIMENT

A preferred embodiment of the present invention will be described with reference to the accompanying drawings.

Figure 1:
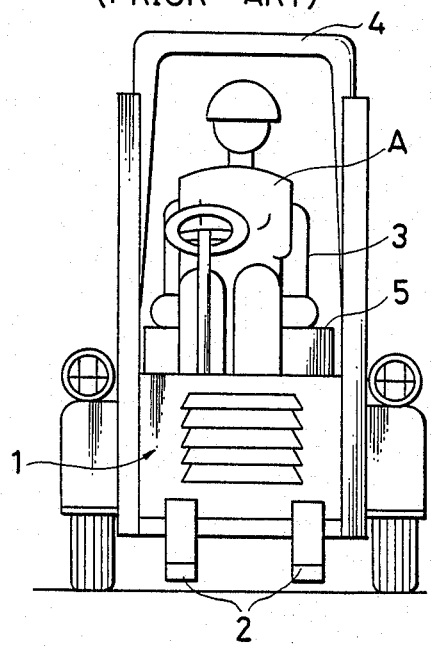
FIG. 1 is a front view showing the forklift truck provided with the conventional seat.
Figure 2:
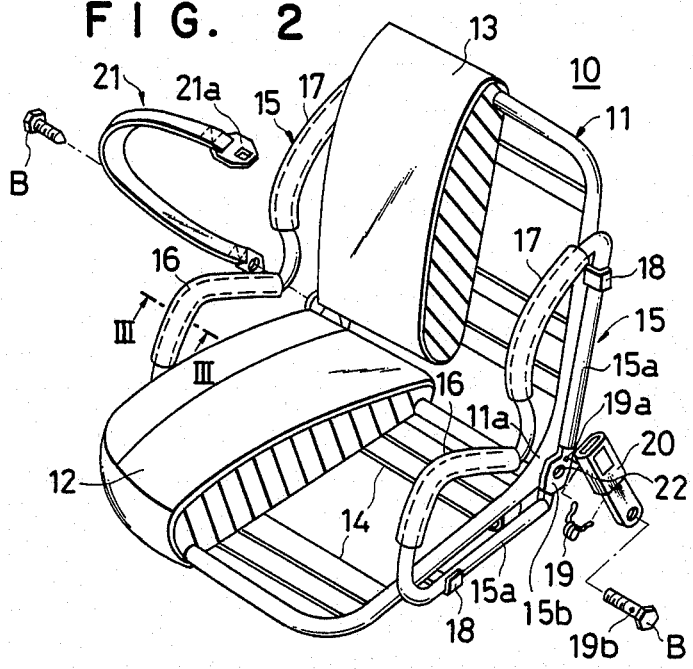
FIG. 2 is a perspective view showing an example of the driver holder seat according to the present invention.

FIG. 2 shows an example of the driver holder seat according to the present invention. The driver holder seat 10 includes a seat frame 11 shaped to form a seat, a seat cushion 12 held at the upper portion of the seat frame 11 and made to cover a pad like a bag, a seat back 13 held at the lower portion of the seat frame 11 and made also to cover a pad like a bag, and a pair of brackets 14 bridged at the lower portion of the seat frame 11 to enable the seat to be attached to the floor of industrial vehicles.

Figure 3:
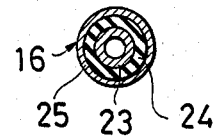
FIG. 3 is a sectional view taken along a line III—III in FIG. 2.
Figure 4:
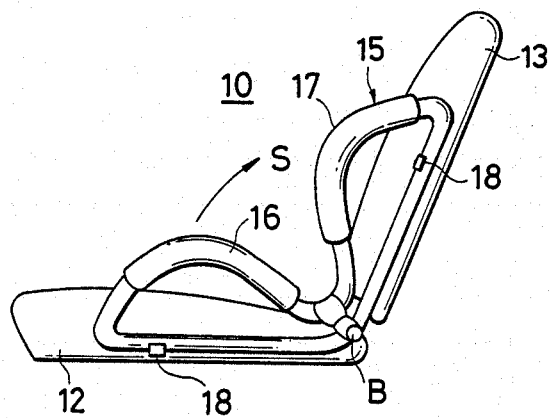
FIG. 4 is a side view showing a member for supporting one side of the driver which is employed by the driver holder seat according to the present invention.
Figure 5:
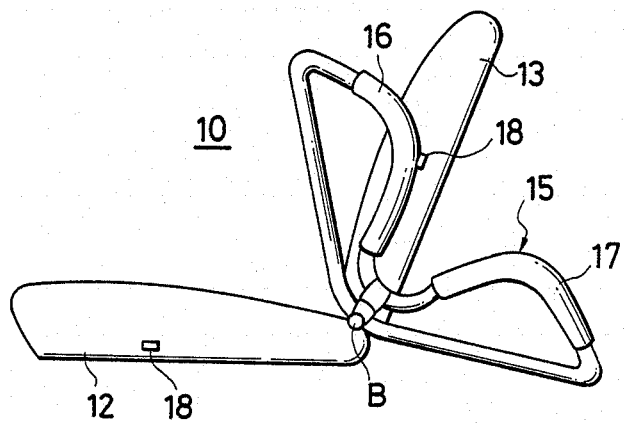
FIG. 5 is a side view showing the support member swung backward.

Members 15 for supporting driver's sides and functioning as side supports for the seat cushion 12 and seat back 13 are arranged on both sides of the seat 10. As shown in FIG. 3, the side support member 15 is made by bending a pipe or the like and it includes a bent portion 15a extending along the side of the seat frame 11 and a pair of protection portions 16 and 17 swelling from both ends of the bent portion 15a to serve as the side supports. The center of the bent portion 15a is made flat to form an attaching portion 15b and the side support member 15 is pivoted directly on one side of that portion of the seat frame 11 where the seat cushion 12 is crossed with the seat back 13 by means of a bolt (B) inserted into a hole 22 in the attaching portion 15b. The bolt (B) is screwed into a nut in the seat frame 11. The side support member 15 thus pivoted can be swung in a direction shown by (S) in FIG. 4 from its normal state to its erected state shown in FIG. 5 and this swinging movement of the side support member 15 is limited by a pair of stoppers 18 on one side of the seat frame 11. For performing this swinging movement, the protection portions 16, 17 of the side support member 15 overhang outward from the plane including the bent portion 15a so as to prevent the protection portions from interfering with the stoppers 18. A coil spring 19 is attached to the side support member 15. More specifically, one end of this coil spring 19 is fitted into a hole 19a in the attaching portion 15b and the other end of the coil spring 19 into a hole 19b in the bolt (B) to usually urge the side support member 15 to its normal state.

The protection portions 16 and 17 are positioned as the side supports for the seat cushion 12 and seat back 13 and each of them includes a core portion 23, a pad 24 enclosing the core portion 23, and a surface skin 25 covering the pad 24, as shown in FIG. 3. When the side support members 15 are under their normal state, therefore, the driver's upper and lower halves are held by their protection portions 16 and 17 to sufficiently protect the driver from swinging left and right. When he is to sit on and get off the seat 10, he is not hindered by the protection portions 16 and 17 because the side support members 15 can be swung backward as described above.

The seat 10 is designed to have a buckle 20 attached thereto together with one of the side support members 15 and when a tongue 21a of a webbing belt 21 is locked into the buckle 20, the driver can be fastened on to the seat 10. The webbing belt 21 may be attached to the seat 10 together with the other side support member 15 or it may be attached to the floor of the vehicle.

Although the present invention has been described citing one of the preferred embodiments, it should be understood that various changes and modifications can be made without departing from the spirit and scope of the present invention.

I claim:

1. A driver holder seat for an industrial vehicle comprising:
   a generally horizontally oriented seat cushion;
   a generally vertically oriented seat back positioned along the rear side of said seat cushion;
   a seat frame supporting said seat cushion and seat back and extending to a point adjacent the rear edge of seat seat cushion;
   a side support member on each side of said seat cushion and seat back,
   means for pivotally connecting at least one of said support members to said frame at said point adjacent the rear edge of the seat cushion;
   each of said support members comprising a first body protection portion and a second body protection portion integrally formed with said first body protection portion;
   said first body protection portion extending upwardly from the side of the seat cushion and being adapted to hold and protect a seat occupant's lower body half, and said second protection portion projecting forwardly from the side of the seat back and being adapted to hold and protect a seat occupant's upper body half;
   at least one of said side supporting members being swingable backward about said pivot connection.

2. An industrial vehicle comprising a vehicle chassis and a driver's seat mounted on top of said chassis, wherein said driver's seat comprises a seat as defined by claim 1.

3. A driver holder seat according to claim 1 wherein each of the side support members comprises a bent pipe.

4. A driver holder seat according to claim 1 further comprising stopper means attached to the seat frame on certain positions thereof to stop the swinging movement of the side support members.

5. A driver holder seat according to claim 3 wherein the protection portions of the side support members are provided with cushion material on the outer surface of the pipe.

6. A driver holder seat according to claim 1 further comprising a buckle and a webbing belt attached centrally of the side support members.

* * * * *